(12) United States Patent
Chi et al.

(10) Patent No.: US 9,765,924 B2
(45) Date of Patent: Sep. 19, 2017

(54) ADJUSTABLE SUPPORT FOR MULTI-AXIS AND HOST DEVICE

(71) Applicant: COOLER MASTER TECHNOLOGY INC., New Taipei (TW)

(72) Inventors: Chia-Hsiang Chi, New Taipei (TW); Shun-Zhang Wu, New Taipei (TW)

(73) Assignee: COOLER MASTER TECHNOLOGY INC., New Taipei (TW)

( * ) Notice: Subject to any disclaimer, the term of this patent is extended or adjusted under 35 U.S.C. 154(b) by 0 days.

(21) Appl. No.: 15/131,573

(22) Filed: Apr. 18, 2016

(65) Prior Publication Data

US 2017/0191610 A1    Jul. 6, 2017

(30) Foreign Application Priority Data

Dec. 31, 2015    (CN) .................... 2015 2 1136471 U

(51) Int. Cl.
   *G06F 1/18*    (2006.01)
   *F16M 13/02*   (2006.01)

(52) U.S. Cl.
   CPC ............. *F16M 13/02* (2013.01); *G06F 1/184* (2013.01); *G06F 1/185* (2013.01); *G06F 1/186* (2013.01); *G06F 1/188* (2013.01)

(58) Field of Classification Search
   CPC .................................. G06F 1/185; G06F 1/186
   See application file for complete search history.

(56) References Cited

U.S. PATENT DOCUMENTS

| | | | | |
|---|---|---|---|---|
| 4,268,100 A | * | 5/1981 | Kekas | H05K 7/16 361/725 |
| 5,417,580 A | * | 5/1995 | Tsai | H01R 12/7005 439/328 |
| 5,642,263 A | * | 6/1997 | Lauruhn | G06F 1/184 211/41.17 |
| 5,708,563 A | * | 1/1998 | Cranston, III | G06F 1/184 361/679.6 |
| 5,734,551 A | * | 3/1998 | Hileman | G06F 1/184 361/695 |
| 5,757,618 A | * | 5/1998 | Lee | G06F 1/184 361/679.32 |
| 5,822,193 A | * | 10/1998 | Summers | H05K 7/1408 361/740 |
| 5,884,779 A | * | 3/1999 | Rich | H05K 7/1404 211/41.17 |

(Continued)

*Primary Examiner* — Adrian S Wilson
(74) *Attorney, Agent, or Firm* — Maschoff Brennan

(57) ABSTRACT

An adjustable support for multi-axis is adapted for a host device where at least one element is installed. The adjustable support for multi-axis comprises a base, at least one installation element and a support element. The base comprises an installation portion and a slide-guiding portion. The installation portion is located at one end of the base, and the slide-guiding portion is located at the center of the base. The installation element is disposed on the installation portion for being detachably attached to the host device. The support element is adjustably disposed on the slide-guiding portion. When the support element is fixed, one end of the support element is capable of supporting the at least one element. When adjusting the position of the support element, the support element is capable of moving on the slide-guiding portion and rotating about the slide-guiding portion.

18 Claims, 12 Drawing Sheets

(56) References Cited

U.S. PATENT DOCUMENTS

| | | | | |
|---|---|---|---|---|
| 6,022,234 A * | 2/2000 | Shinoto | ............... | G06F 1/184 |
| | | | | 361/801 |
| 6,220,887 B1 * | 4/2001 | Downs | ............... | H01R 12/7005 |
| | | | | 361/801 |
| 6,353,541 B1 * | 3/2002 | Leman | ............... | G06F 1/183 |
| | | | | 211/41.17 |
| 6,409,518 B1 * | 6/2002 | Hung | ............... | G06F 1/184 |
| | | | | 361/801 |
| 6,466,448 B1 * | 10/2002 | Baik | ............... | G06F 1/183 |
| | | | | 361/752 |
| 6,870,744 B2 * | 3/2005 | Kosugi | ............... | G06F 1/184 |
| | | | | 211/41.17 |
| 6,885,565 B2 * | 4/2005 | Shi | ............... | G06F 1/184 |
| | | | | 361/732 |
| 7,990,735 B2 * | 8/2011 | Yeh | ............... | H05K 7/1402 |
| | | | | 361/801 |
| 8,072,751 B2 * | 12/2011 | Farrow | ............... | G06F 1/183 |
| | | | | 361/679.6 |

* cited by examiner

ADJUSTABLE SUPPORT FOR MULTI-AXIS AND HOST DEVICE

CROSS REFERENCE TO RELATED APPLICATIONS

This Non-provisional application claims priority under 35 U.S.C. §119(a) on Patent Application No(s). 201521136471.1 filed in People's Republic of China on Dec. 31, 2015, the entire contents of which are hereby incorporated by reference

BACKGROUND

Technical Field

The present invention relates to an adjustable support for multi-axis and a host device.

Related Art

Computer mainly comprises case, power supply, main board, central processing unit, display card, interface card, random access memory, etc. Most of the above elements are installed inside of the case.

Nowadays, the computing ability of graphic processing unit of the display card is very powerful. The length of many display cards is much longer than the length of other display cards or interface cards. If long display cards are merely supported by card slot, pin wear between long display cards and their slot easily results in poor contact there between.

SUMMARY

An aspect of the disclosure is to provide an adjustable support for multi-axis which is easily installed, and a host device having the same.

An adjustable support for multi-axis is adapted for a host device where at least one element is installed. The adjustable support for multi-axis comprises a base, at least one installation element and a support element. The base comprises an installation portion and a slide-guiding portion. The installation portion is located at one end of the base, and the slide-guiding portion is located at the center of the base. The installation element is disposed on the installation portion for being detachably attached to the host device. The support element is adjustably disposed on the slide-guiding portion. When the support element is fixed, one end of the support element is capable of supporting the at least one element. When adjusting the position of the support element, the support element is capable of moving on the slide-guiding portion and rotating about the slide-guiding portion.

In one embodiment, a frame of the host device includes at least a positioning element, the installation element is a convex column configured to insert into and fix on at least one of the positioning element, the adjustable support for multi-axis is fixed on the host device, and the adjustable support for multi-axis is capable of being dismantled by hand. The support element supports the at least one element along a vertical direction.

In one embodiment, the installation element is adjustably disposed on the installation portion. The installation element is capable of moving on the installation portion for adjusting the position of the installation element on the installation portion.

In one embodiment, the installation element includes at least two stand bars, the stand bars are configured to rotate around the installation portion for being disposed on the installation portion, such that the angle between the stand bars is adjustable.

In one embodiment, the stand bars include magnetic pieces, the magnetic piece attaches on the host device, such that the installation element is detachably disposed on the host device.

In one embodiment, the base further comprises at least one bending portion, one end of the bending portion connects one end of the slide-guiding portion, and another end of the bending portion connects the installation portion.

In one embodiment, the slide-guiding portion is a cylinder or a prism.

In one embodiment, the base comprises a plurality of shafts, and the shafts are sequentially combined to form slide-guiding portion.

In one embodiment, one end of each shaft includes a male pitch thread, and another end of each shaft includes a female pitch thread.

In one embodiment, the support element further includes a slide-rotating portion and a support portion. The slide-rotating portion is adjustably disposed on the slide-guiding portion. When adjusting the position of the support element, the slide-rotating portion is capable of moving along the first direction on the slide-guiding portion and rotating about the slide-guiding portion. The support portion connects the slide-rotating portion. When the slide-rotating portion is fixed, the support element is capable of supporting the at least one element.

In one embodiment, the support element is board-shaped or frame-shaped.

In one embodiment, the slide-rotating portion is adjustably fixed on the slide-guiding portion by a screw.

In one embodiment, the support element comprises a main body and a cam. The main body includes a through hole for being passed through by the slide-guiding portion. The cam is pivoted on the main body and adjustably abutted on the slide-guiding portion.

In one embodiment, the support element comprises a main body and a self-locking spring slice. The main body includes a through hole for being passed through by the slide-guiding portion. The self-locking spring slice is disposed in the main body and abutted the slide-guiding portion. When the self-locking spring slice is pressed and pushed, the slide-guiding portion is released from the self-locking spring slice.

A host device comprises a case and the adjustable support for multi-axis mentioned above. The adjustable support for multi-axis is detachably disposed on the case.

As mentioned above, as to the adjustable support for multi-axis and host device, the adjustable support for multi-axis is capable of being easily installed in the host device. The position of the adjustable support for multi-axis is adjusted according to the length and the position of the interface card to be supported and the space in the case. Accordingly, the adjustable support for multi-axis is capable of supporting the element in the host device at proper position. Otherwise, users can fix the installation portion of the adjustable support for multi-axis on the frame of the computer case, or even detach from the frame. In addition, the frame includes a plurality of positioning elements. Users can choose positioning element on the appropriate position to install the adjustable support for multi-axis. Hence, users are able to adjust the position of the adjustable support for multi-axis according to the position of the elements in the computer case. Thus, the adjustable support for multi-axis is able to be located on the appropriate position to support the element installed on the host device.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

The embodiments of the invention will be apparent from the following detailed description, which proceeds with reference to the accompanying drawings, wherein the same references relate to the same elements.

Figure 1A:
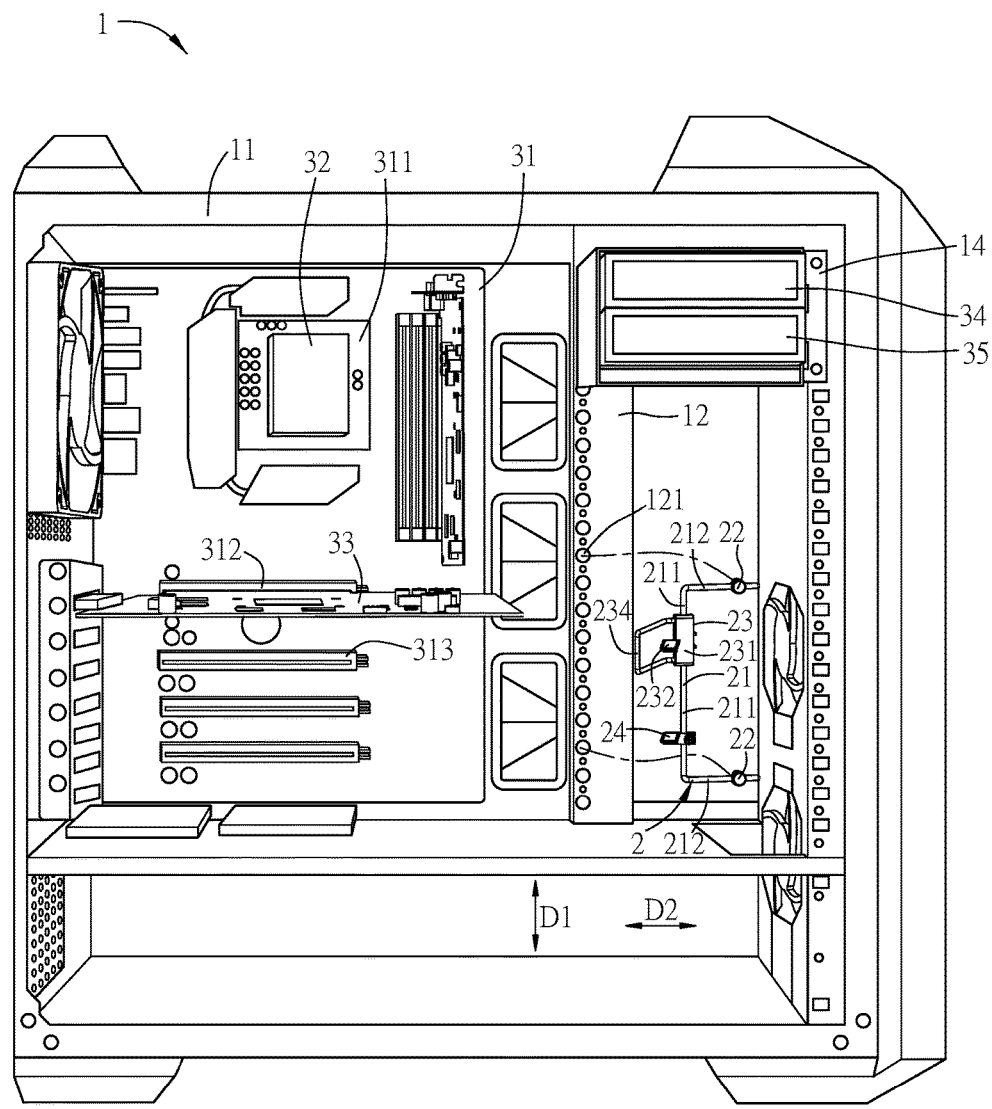
FIG. 1A shows an assembling schematic view of an adjustable support for multi-axis and a case in a host device.
Figure 1B:
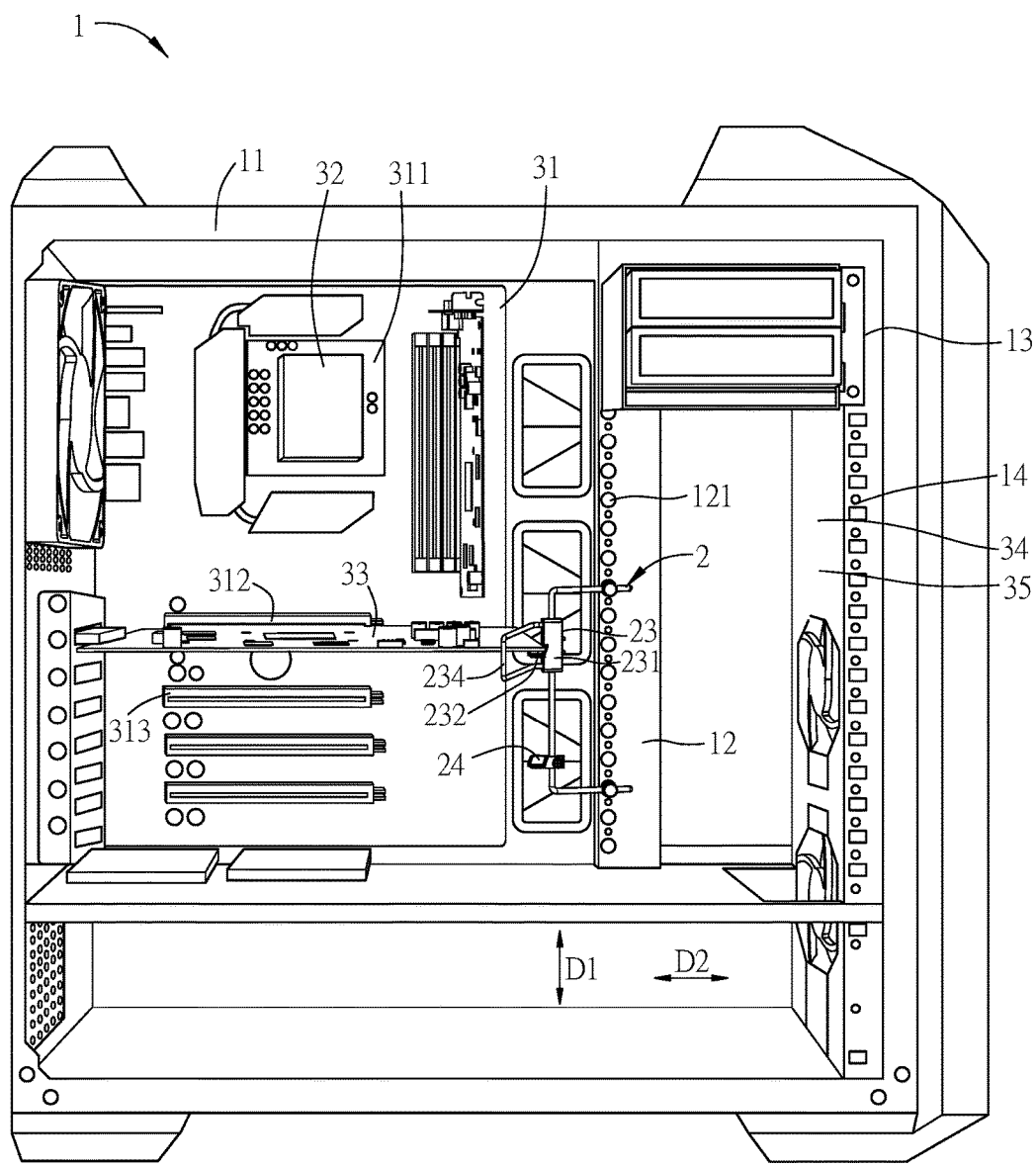
FIG. 1B shows schematic view of the adjustable support for multi-axis installed in the case.

FIG. 1A shows an assembling schematic view of an adjustable support for multi-axis and a case in a host device. FIG. 1B shows schematic view of the adjustable support for multi-axis installed in the case. As shown in FIG.1A and FIG.1B, a host device 1 includes a case 11, a frame 12, an internal expansion shelf 14, an adjustable support for multi-axis 2 and multiple elements. These elements includes, for example, a main board 31, a central processing unit 32, a display card 33, a storage device 34 or an expansion device 35. The frame 12, the internal expansion shelf 14, the adjustable support for multi-axis 2 and multiple elements such as the main board 31, the central processing unit 32, display card 33, storage device 34 and expansion device 35, are installed on the internal expansion shelf 14. The internal expansion shelf 14 is fixed on the frame 12, and the frame 12 and the main board 31 are disposed on the case 11. For example, the host device 1 is a desktop computer host, which is an upright computer host device.

Generally speaking, the front side of a computer case means the side for users to directly use. The front side of a computer case is usually provided with power switch and reset switch. The backside of a computer case are usually provided with varieties of input and output ports to connect with varieties of external device, such as printer or network equipment. Otherwise, the bottom side of a computer case generally means the side facing the ground.

In most of the upright computer host device, devices with 3.5-inch scale usually disposed above devices with 2.5-inch scale. Devices with 3.5-inch scale are such as, but not limited to CD-ROM drive. Devices with 2.5-inch are such as, but not limited to a hard disk drive (HDD) or a solid state disk (SSD), and the expansion devices are such as a card reader. In addition, case 11 may only be provided with single scale internal expansion shelf. For example, the internal expansion shelf 14 is provided for devices with 2.5-inch scale. Storage device 34 and expansion device 35 are 2.5-inch scale. The storage device 34 is such as, but not limited to a hard disk drive or a solid-state disk, and the expansion device 35 is such as a card reader.

Otherwise, the central processing unit 32 and memory are usually disposed on the top half of the main board 31, and the display card is usually located in the middle of the main board 31. The graphic processing unit of the display card 33 is usually facing the bottom side of the case 11 instead of facing the central processing unit 32, that is, the front side of the display card 33 is provided with graphic processing unit, memory and heat dissipating device. The backside of the display card 33 faces the central processing unit 32. Hence, the central processing unit 32 and the display card 33 apply different region of case 11 to dissipate heat.

Most of the display card 33 is inserted in the card slot on the main board 31, thus dividing the case into two regions. The central processing unit 32 is located on the top half region of the case 11, and the display card 33 is in the middle region of the case 11.

Frame 12 includes a plurality of positioning elements 121. Each of the positioning elements is arranged randomly or arranged regularly according to a configuration rule. Users may choose appropriate positioning elements 121 for installing other accessories, such as internal expansion shelf 14 and/or adjustable support for multi-axis according to the actual use factors, such as internal space limitation of the case, heat dissipating condition or convenience for use. That is, the height of internal expansion shelf 14 and/or adjustable support for multi-axis 2 in the case 11 is capable of being adjusted by users. In this embodiment, positioning elements 121 are regularly aligned, and the configuration rule of the positioning elements 121 is spacing a fixed distance. In addition, in other embodiments, configuration rule may be different.

In this embodiment, the internal expansion shelf 14 includes an installation portion. The internal expansion shelf 14 is fixed on the positioning element 121 of the frame 12, and internal expansion shelf 14 is capable of being dismantled by hand. The positioning element 121 and the installation portion may be a corresponding structure to each other, such as a pore and a convex column, which is not for limited sense. In this embodiment, the positioning element 121 is pore-shaped, and the installation portion installed on the installation element is a convex column.

In this embodiment, dismantling by hand means installing, fixing, or detaching elements with hand tools such as screwdriver or wrench.

The adjustable support for multi-axis 2 includes a base 21, two installation elements 22 and a support element 23. The base 21 includes two installation portions 212 and a slide-guiding portion 211. The installation portions are located at two ends of the base 21. The slide-guiding portion 211 is located at the center of the base 21. The installation elements 22 are disposed on the installation portion 212, respectively, providing for the host device 1 to be detachably disposed on the first direction D1, for example, disposed on the case 11. Support element 23 is adjustably disposed on the slide-guiding portion 211. When the position of the support element 23 is fixed, one end of the support element 23 supports at least one element, such as display card installed on the host device 1. While adjusting the position of the support element, the support element 23 is capable of moving along the first direction D1 on the slide-guiding portion 211 and rotating about the slide-guiding portion 211.

The support element 23 can be locked on the slide-guiding portion 211 by screw. In one embodiment, the support element 23 includes 1 a pore tightly attached on the slide-guiding portion 211. In one embodiment, the support element 23 may be fixed on the slide-guiding portion 211 by other ways.

In this embodiment, positioning elements are 121 porous bodies. The installation element 22 may be a convex column, which is inserted into the positioning elements 121 of the frame 12 in the case 11. The adjustable support for multi-axis 2 is fixed on the frame 12; the adjustable support for multi-axis 2 is capable of being dismantled by hand. The support element 23 supports the element, such as a display card 33, installed on the host device 1 along a vertical direction.

Otherwise, the positioning element 121 and the installation element 22 may be a corresponding structure to each other, such as a pore and a convex column, which is not for limited sense. In addition, the positioning element 121 and the installation element 22 may be assembled and fixed by magnetic force. One of the positioning element 121 and the installation element 22 or both of the positioning element 121 and the installation element 22 contain magnetic force.

The installation elements 22 are adjustably disposed on the installation portion 212, respectively. The installation elements 22 are capable of moving along the second direction D2 on the installation portion 212, respectively, for adjusting the position of the installation elements 22 on the installation portion 212. The first direction D1 and the second direction D2 are substantially vertical to each other. For example, while the first direction D1 is a vertical direction, the second direction D2 is a horizontal direction.

Figure 1C:
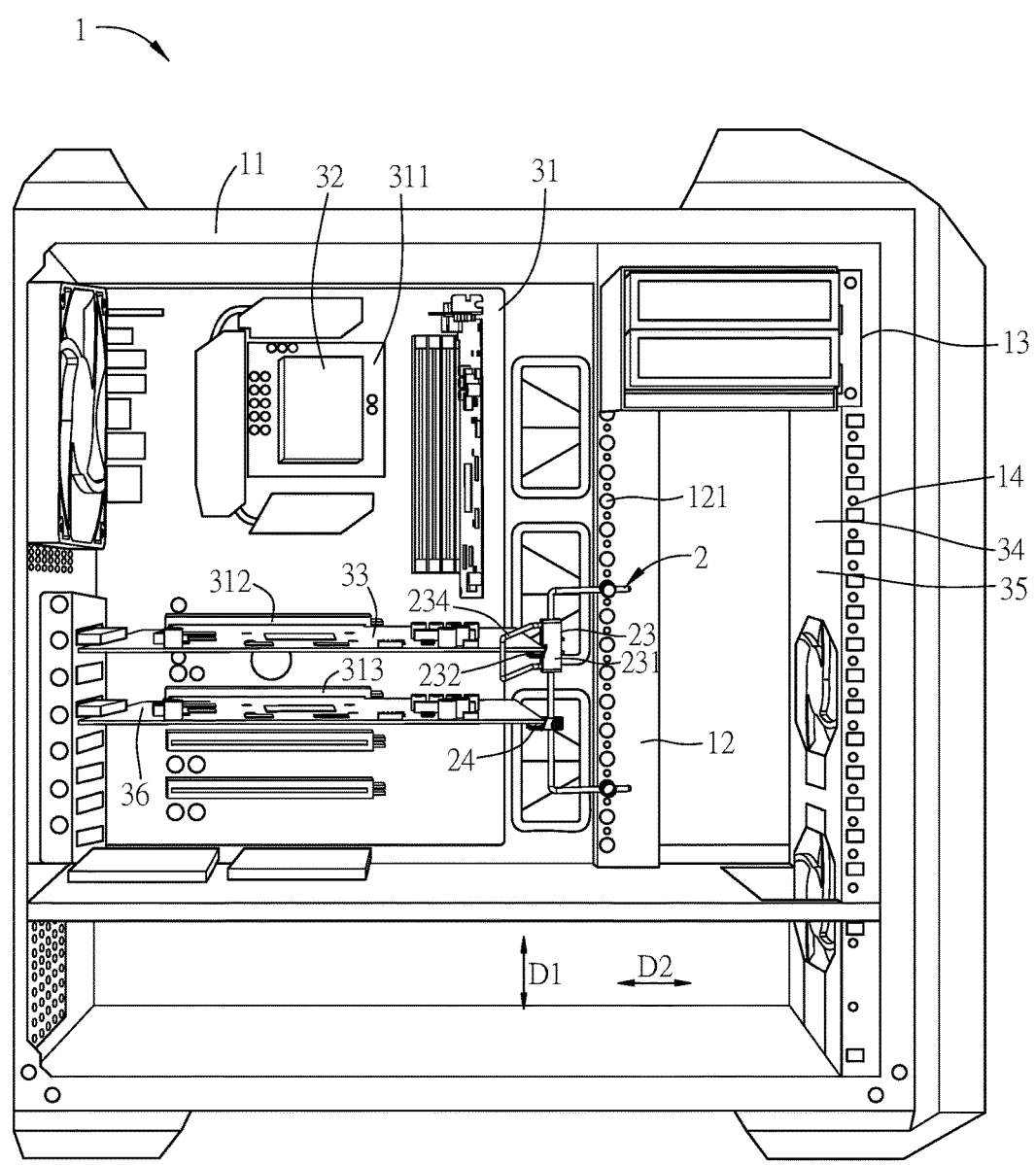
FIG. 1C shows schematic view of adjustable support for multi-axis and multiple display cards installed on the case in the host device.

FIG. 1B shows the main board 31 installed with a display card 33, which is supported by a support element 23. In addition, the host device 1 is capable of being installed with multiple display cards, which are supported by multiple support members. FIG. 1C shows schematic view of adjustable support for multi-axis and multiple display cards installed on the interface card on the host device 1. The display card 33 is installed on the card slot 312. The display card 36 is installed on the card slot 313. The support members 23 and 24 support the display cards installed in the host device 1 in vertical direction. For example, the support member 23 supports the display card 33, and the support member 24 supports the display card 36.

Figure 2A:
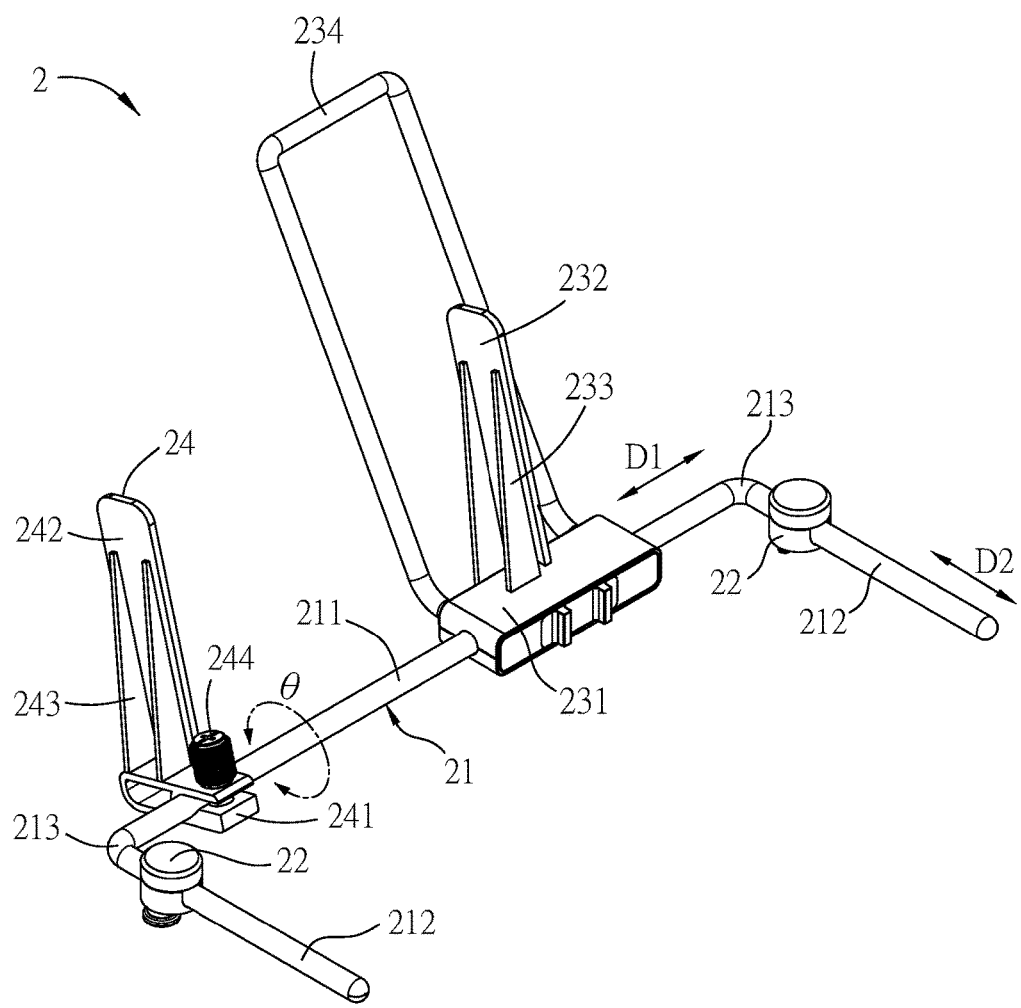
FIG. 2A to FIG. 2C show perspective view of the adjustable support for multi-axis with different perspectives.
Figure 2B:
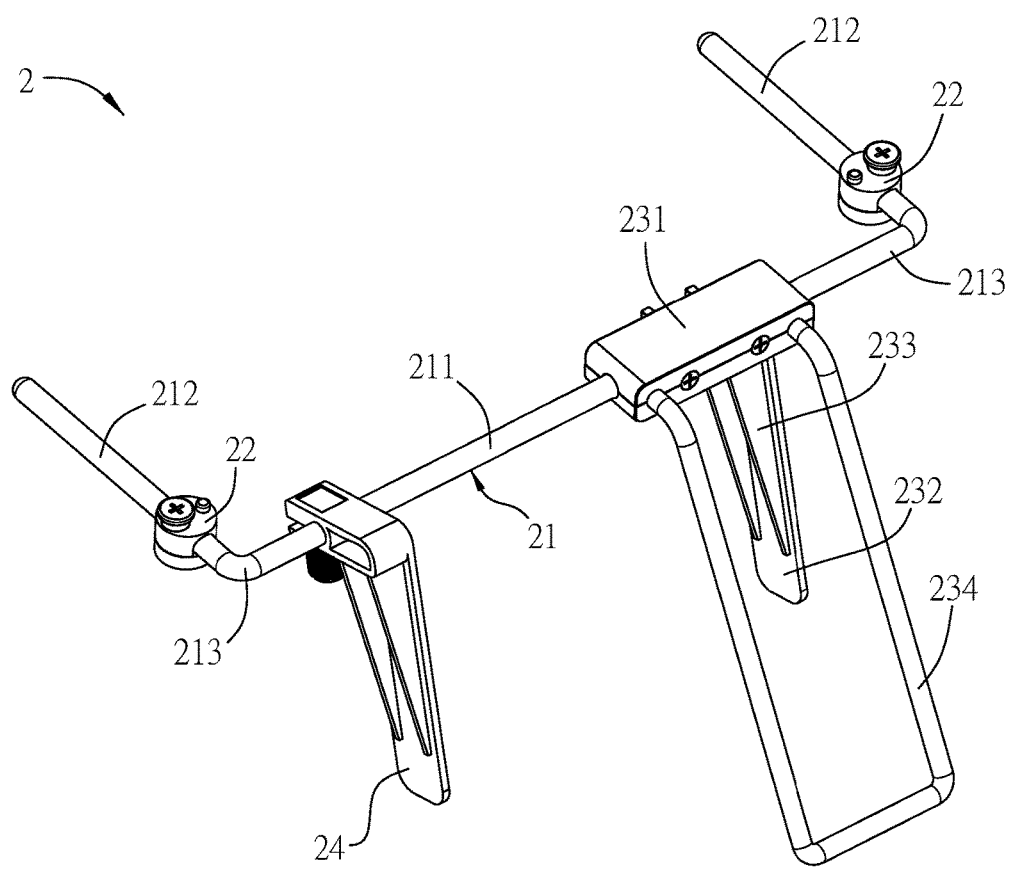
Figure 2C:
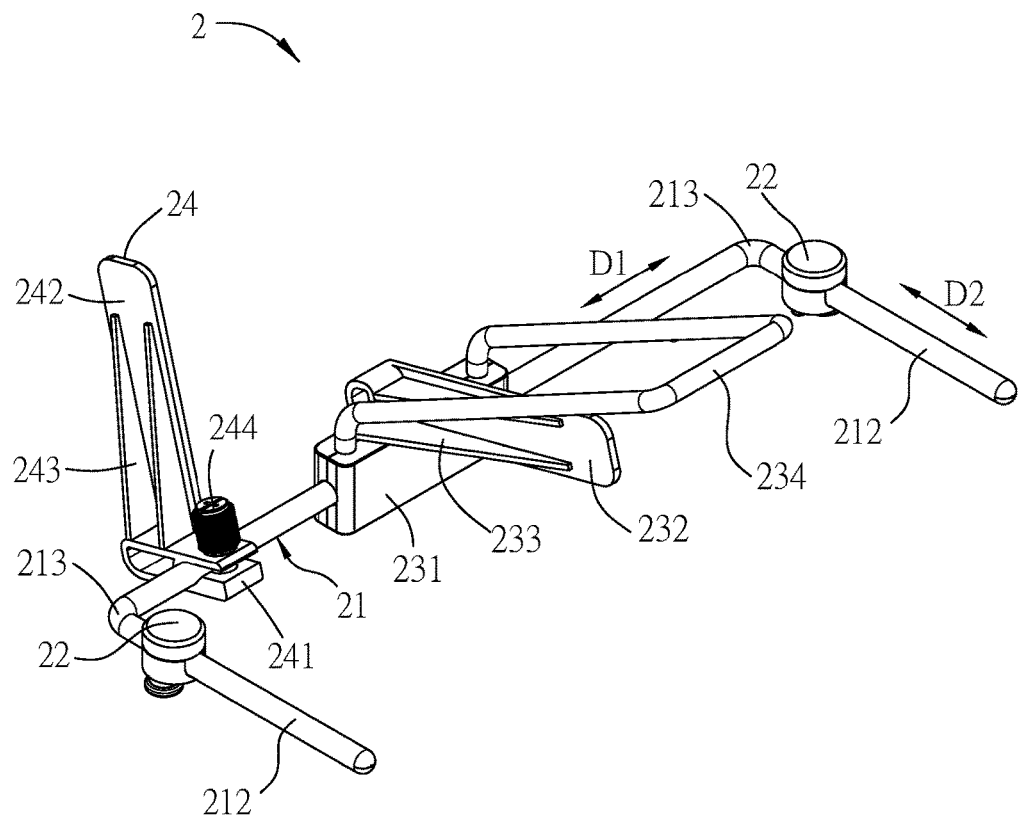

FIG. 2A to FIG. 2C show perspective view of the adjustable support for multi-axis with different perspectives. FIG. 2A and FIG. 2B are two-side perspective views of the adjustable support for multi-axis. FIG. 2C is the same perspective view as FIG. 2A. However, the support element 23 rotates 90 degrees clockwise.

With reference to FIG. 2A to FIG. 2B, in one embodiment, the frame 21 further includes two bending portions 214. Two ends of each bending portion 213 connect to the two ends of the slide-guiding portion 211, respectively. Another end of the bending portions 213 connect the installation portion 212, respectively.

In this embodiment, the base 21 is a cylinder with constant diameter. In addition, the base 21 might be a prism, such as a hexagon or a dodecagon; thereby the angle of the support element 23 can be adjusted piecewise.

Otherwise, the slide-guiding portion 211 and the installation portion 212 of the base 21 might be different cylinder with different size and shapes. For example, both of the slide-guiding portion 211 and the installation portion 212 are cylinder, but the radius of the slide-guiding portion 211 is larger than the radius of the installation portion 212; or the slide-guiding portion 211 is a prism, and the installation portion 212 is a cylinder.

In this embodiment, support element 23 includes a slide-rotating portion 231, a support portion 232, a strengthening arm 233 and a support portion 234. The strengthening arm 233 connects slide-rotating portion 231 and the support portion 232. The strengthening arm 233 is configured to strengthen structural strength to enhance the carrying capacity of the support portion 232.

The slide-rotating portion 231 is adjustably disposed on the slide-guiding portion 211. While adjusting the position of the support element 23, the slide-rotating portion 231 is capable of moving along the first direction D1 on the slide-guiding portion 211 and rotating about the slide-guiding portion 211. The support portion 232 connects the slide-rotating portion 231. While the slide-rotating portion 231 is fixed, the support element 232 is capable of supporting the elements installed on the host device 1.

The slide-rotating portion 231 includes a through hole for being passed through by the slide-guiding portion 211; in the meantime, the slide-rotating portion 231 and the slide-guiding portion 211 are closely fit. For example, the through hole of the slide-rotating portion 231 includes slightly flexible material with shrink ability. The slide-rotating portion 231 closely contacts the slide-guiding portion 211 without moving while the slide-rotating portion 231 is unstressed on the radial direction. When users apply pressure on the slide-rotating portion 231 on the radial direction, the through hole may be slightly expanded, such that the slide-rotating portion 231 and the slide-guiding portion 211 are not closely contacted, and the slide-rotating portion 231 is capable of moving along the slide-guiding portion 211 and rotating about the slide-guiding portion 211. While the slide-rotating portion 231 is adjusted to a specified location and is no longer applied pressure, the position of the support element 23 is fixed.

Otherwise, the adjustable support for multi-axis 2 incudes a plurality of support members 23 and 24. These support members 23 and 24 are installed on the slide-guiding portion 211. In this embodiment, the support member 24 includes a slide-rotating portion 241, a support portion 242, a strengthening arm 243 and a support portion 244. The strengthening arm 243 connects slide-rotating portion 241 and the support portion 242. The strengthening arm 243 is configured to strengthen structural strength to enhance the carrying capacity of the support portion 242. The slide-rotating portion 241 is adjustably fixed on the slide-guiding portion 211 by a screw 244. The screw 244 is capable of locking the slide-rotating portion 241 on the slide-guiding portion 211, such that the slide-rotating portion 241 is fixed without moving or rotating. While the screw 244 is turning loose, the slide-rotating portion 241 is capable of moving along the slide-guiding portion 211 and rotating about the slide-guiding portion 211.

In addition, the support members board-shaped or frame-shaped, for example, the support member 232 is board-shaped, and the support member 234 is frame-shaped. The support member 232 with board-shaped supports the display card 33 along a vertical direction (e.g. the first direction D1), and the support member 234 with board-shaped supports the display card 36 along a vertical direction (e.g. the first direction D1). Instead of supporting the display card 33, the support member 234 with frame-shaped is further capable of limiting the display card from shaking. In addition, the support member 234 with frame-shaped is also used for binding and putting the wires together, preventing the wires being scattered. The shape of the support member 234 with frame-shaped may be U-shaped or hook-shaped. In other embodiment, the support member 23 may only include the support member 234 with frame-shaped without the support member 232 with board-shaped.

As shown in FIG. 2C, before installing the adjustable support for multi-axis 2 on the frame 12, the support member 23 of the adjustable support for multi-axis 2 is rotated 90 degrees (e.g. clockwise direction), such that the support member 23 is capable of preventing the display card 33 installed on the main board 31 and installed on the frame 12 and adjusted to the proper position. After being installed on the frame 12, the support member 23 is reversely rotate 90 degrees (e.g. counterclockwise direction), and the support portion 234 of the support member 23 is capable of framing the display card 33.

Figure 3A:
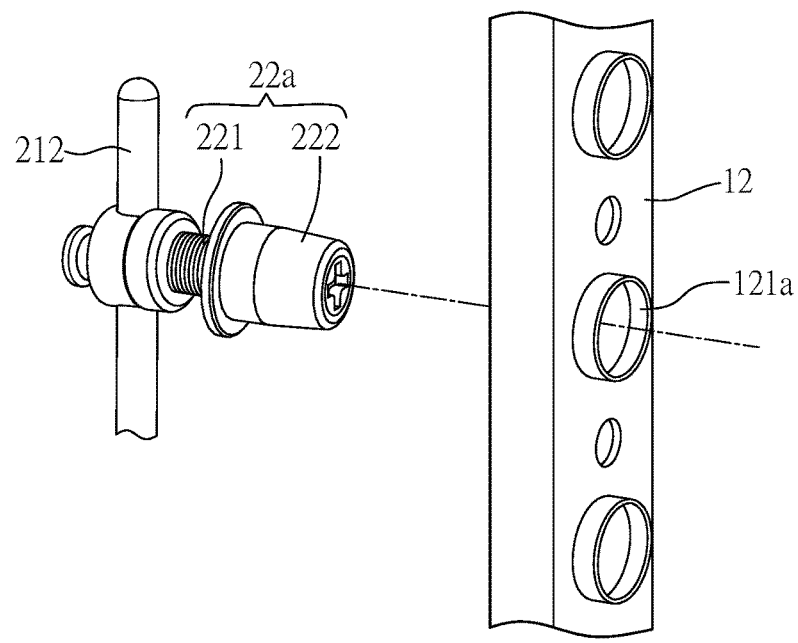
FIG. 3A and FIG. 3B show schematic view of the installation element of the adjustable support for multi-axis and the positioning element of the frame.
Figure 3B:
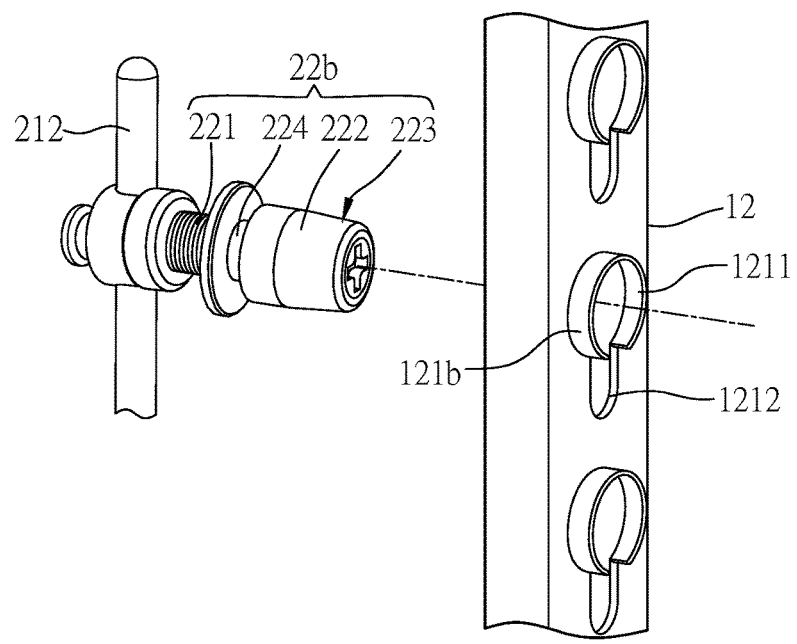

FIG. 3A and FIG. 3B show schematic view of the installation element of the adjustable support for multi-axis and the positioning element of the frame. The installation element may be any structure capable of corresponding and inserting the positioning element. As shown in FIG. 3A, for example, installation element 22a includes a positioning stick 221 and a rubber sleeve 222 surrounding and covering the positioning stick 221. According to this, while the installation element 22a inserted at the corresponding position of the positioning element 121a, the outer margin of the rubber sleeve 222 contacts and interferes the inner margin of the positioning element 121a (pore body), thus being positioned.

The outer diameter of the rubber sleeve 222 shrinks from one end of the positioning stick 221 to the other end of the positioning stick 221, such that the installation element 22a is capable of inserting into the positioning element 12a without precisely alignment. Since the rubber sleeve 222 is pressed with pressure in the inner margin of the positioning element 121a, the deeper the rubber sleeve 222 inserts into the position element 121a, the better the positioning effect is. Even though the frame 12 tilts or dumps, the adjustable support for multi-axis 2 is not easy to fall off.

In addition, as shown in FIG. 3B, in other embodiment, positioning element 121b includes an opening 1211 and a necking groove 1212 with shrinking inner diameter corresponding to the opening 1211. The installation element 22b includes a stick body 223 and a circular groove surrounding the outer margin of the stick body 223. The above mentioned stick body 223 may be any kinds of stick body. As shown in FIG. 3B, the stick body 223 includes the positioning stick 221 and the rubber sleeve 222 surrounded the positioning stick 221 in FIG. 3A.

Accordingly, the installation element 22b inserts into the opening 1211 of the positioning element 121b, moving the positioning element 121b toward the groove of the necking groove 1212. That is, the positioning element 121b is capable of penetrating the circular groove, thus being limited by the necking groove of the positioning element 121b to achieve better positioning effect.

Hence, the adjustable support for multi-axis is easily installed in the case 11. The multiple positioning elements 121 of the frame 12 allow users to adjust the height of the adjustable support for multi-axis 2. The support element 23 and 24 is capable of adjusting the installation height and the coordination angle along the base 21. The installation element 22 is capable of adjusting the position horizontally; making the position of the support element 23 and 24 of the adjustable support for multi-axis 2 on the three-axis can be adjusted. The support element 23 and 24 of the adjustable support for multi-axis 2 is capable of supporting the interface card. Instead of easy installation, the support element can also support elements mounted on the host device 1.

Additionally, in other embodiment, frame 12 is located on the front side of the case 11. The adjustable support for multi-axis 2 is still capable of being mounted on the frame 12. In addition, the internal expansion shelf 14 might have the same or similar changes.

Figure 4:
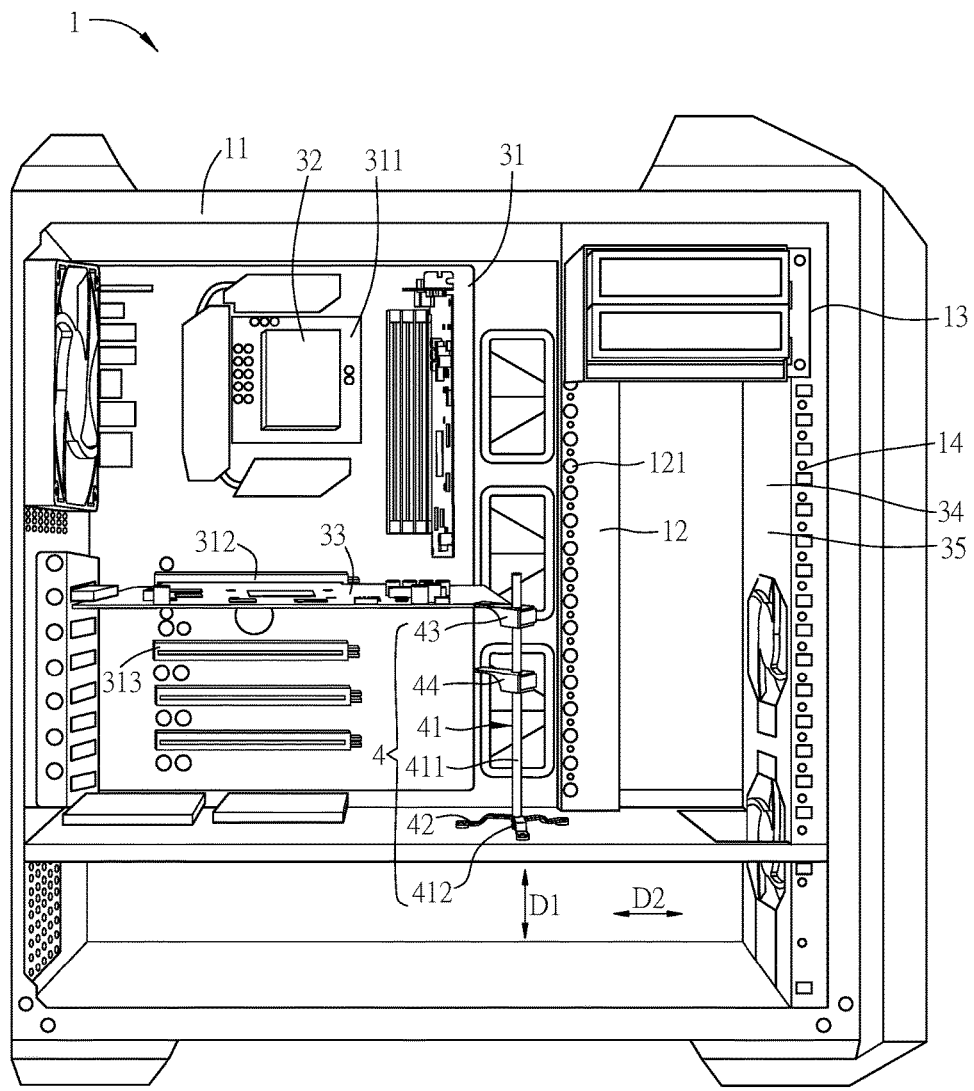
FIG. 4 shows an assembling schematic view of an adjustable support for multi-axis and a case of the host device according to one embodiment.

FIG. 4 shows an assembling schematic view of an adjustable support for multi-axis and a case of the host device according to one embodiment. As shown in FIG. 4, the adjustable support for multi-axis 4 includes a base 41, an installation element 42, a support element 43 and an installation element 44. The base 41 includes an installation portion 412 and a slide-guiding portion 411. The installation portion is located at one end of the base 41. The slide-guiding portion 411 is located at the center of the base 41. The installation element 42 is disposed on the installation portion 212, providing for the host device 1 to be detachably disposed on the case 11. Support element 43 is adjustably disposed on the slide-guiding portion 411. When the position of the support element 43 is fixed, one end of the support element 43 supports at least one element installed on the host device, such as a display card. While adjusting the position of the support element 43, the support element 43 is capable of moving along the first direction D1 on the slide-guiding portion 411 and rotating about the slide-guiding portion 411. The height on the vertical direction (first direction D1) is capable of being adjusted.

In this embodiment, the support member 43 is fixed on the slide-guiding portion 411 through a cam. In addition, support member 43 is capable of being fixed on the slide-guiding portion 411 by a screw. Or the support element 43 includes a through hole closely attached on the slide-guiding portion 411. The support element 23 may be fixed on the slide-guiding portion 411 by other ways.

The adjustable support for multi-axis 4 is detachably fixed on the frame 12, and the adjustable support for multi-axis 4 is capable of being dismantled by hand. The support element 43 supports the element, such as a display card 33, installed on the host device 1 along a vertical direction.

FIG.4 shows the main board 31 installed with a display card 33, which is supported by a support element 43. In addition, the host device 1 is capable of being installed with multiple display cards, which are supported by multiple support members. For example, the support member 43 supports the display card 33, and the support member 44 supports another display card.

Figure 5A:
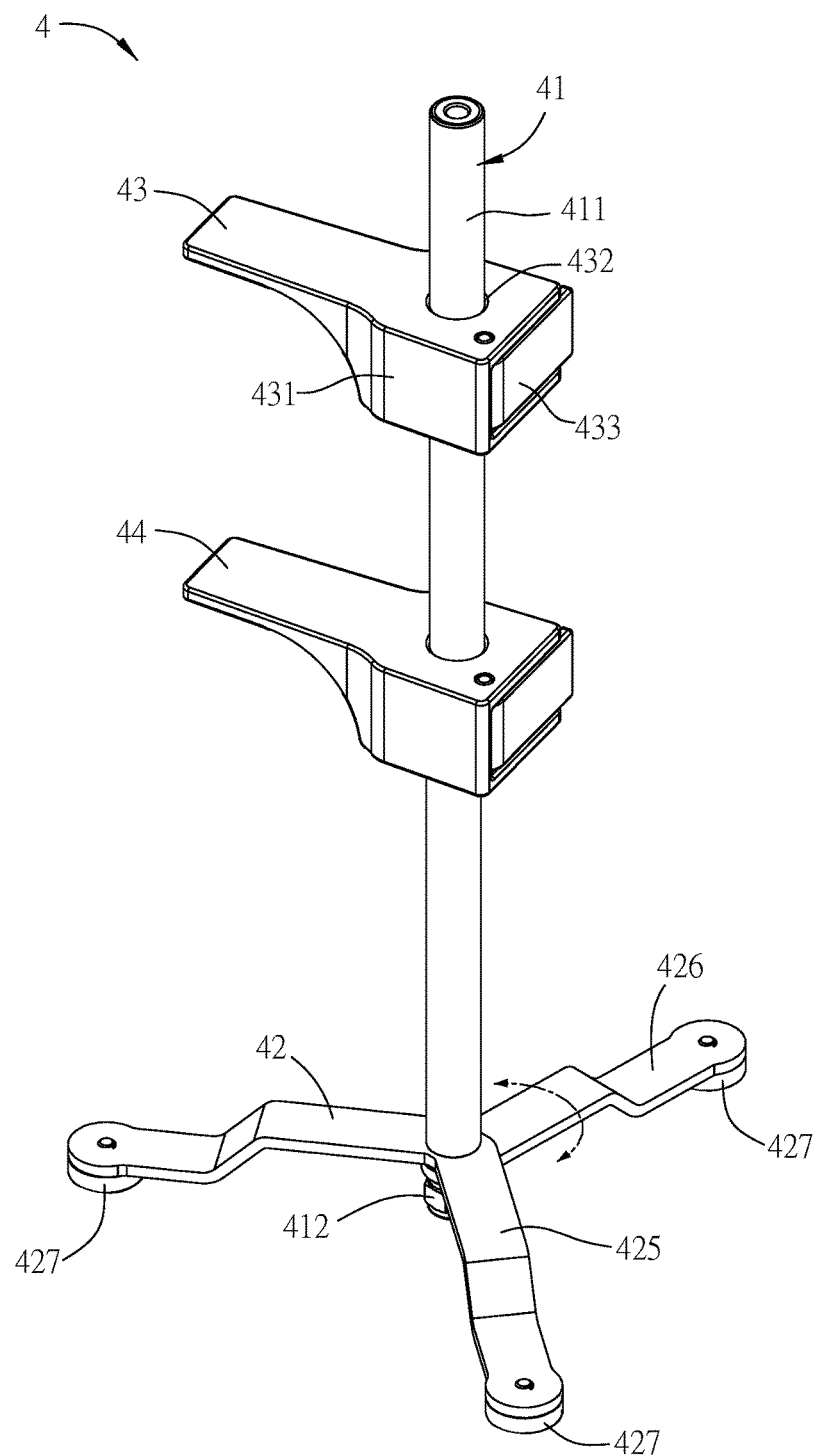
FIG. 5A shows a perspective view of the adjustable support for multi-axis of FIG. 4.

FIG. 5A shows a perspective view of the adjustable support for multi-axis of FIG. 4. As shown in FIG. 5A, the support element 43 includes a main body 431. The main body 431 includes a through hole 432 and a cam 433. The slide-guiding portion 411 passes through the through hole 432. The cam 433 is pivoted on the main body 431 and adjustably abutted on the slide-guiding portion 411. For example, the cam 433 is not abutted the slide-guiding portion 411 on the first position. In the meantime, the position of the support element 43 has not been fixed, and the users can adjust the height and the coordinate angle of the support member 43 along the slide-guiding portion 411. After rotating and abutting the cam 433 on the slide-guiding potion 411, the position of the support element 43 is fixed, and the support element 43 is capable of supporting the element installed on the host device 1.

The installation element 42 includes at least two stand bars 425 and 426, the stand bars 425 and 426 are configured to rotate around the installation portion 412 for being disposed on the installation portion 412, such that the angle between the stand bars 425 and 426 is adjustable. The stand bars 425 and 426 include magnetic piece 427, the magnetic piece 427 attaches on the case 11, such that the installation element 42 is detachably disposed on the case 11.

Figure 5B:
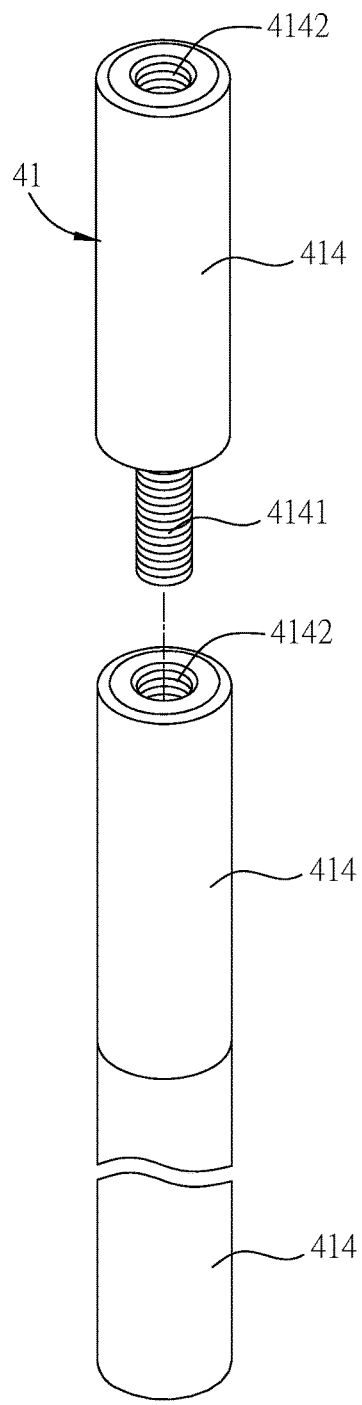
FIG. 5B shows schematic view of multiple shafts of the adjustable support for multi-axis of FIG. 5A.

FIG. 5B shows schematic view of multiple shafts of the adjustable support for multi-axis of FIG. 5A. As shown in FIG. 5B, the base 51 includes multiple shafts. The shafts are sequentially combined to form slide-guiding portion 411. One end of each shaft includes a male pitch thread 4141, and another end of each shaft includes a female pitch thread 4142. The male pitch thread 4141 of the shaft and the female pitch thread 4142 of another shaft connects with each other. Accordingly, the base 41 is easily detached, and the height of the base 41 is easily adjusted. Otherwise, the outer portion of the shafts 411 is wrapped by injection (e.g. with PVC) to achieve anti-skidding effect. In addition, the installation portion 412 might also be assembled with shafts 414.

Figure 5C:
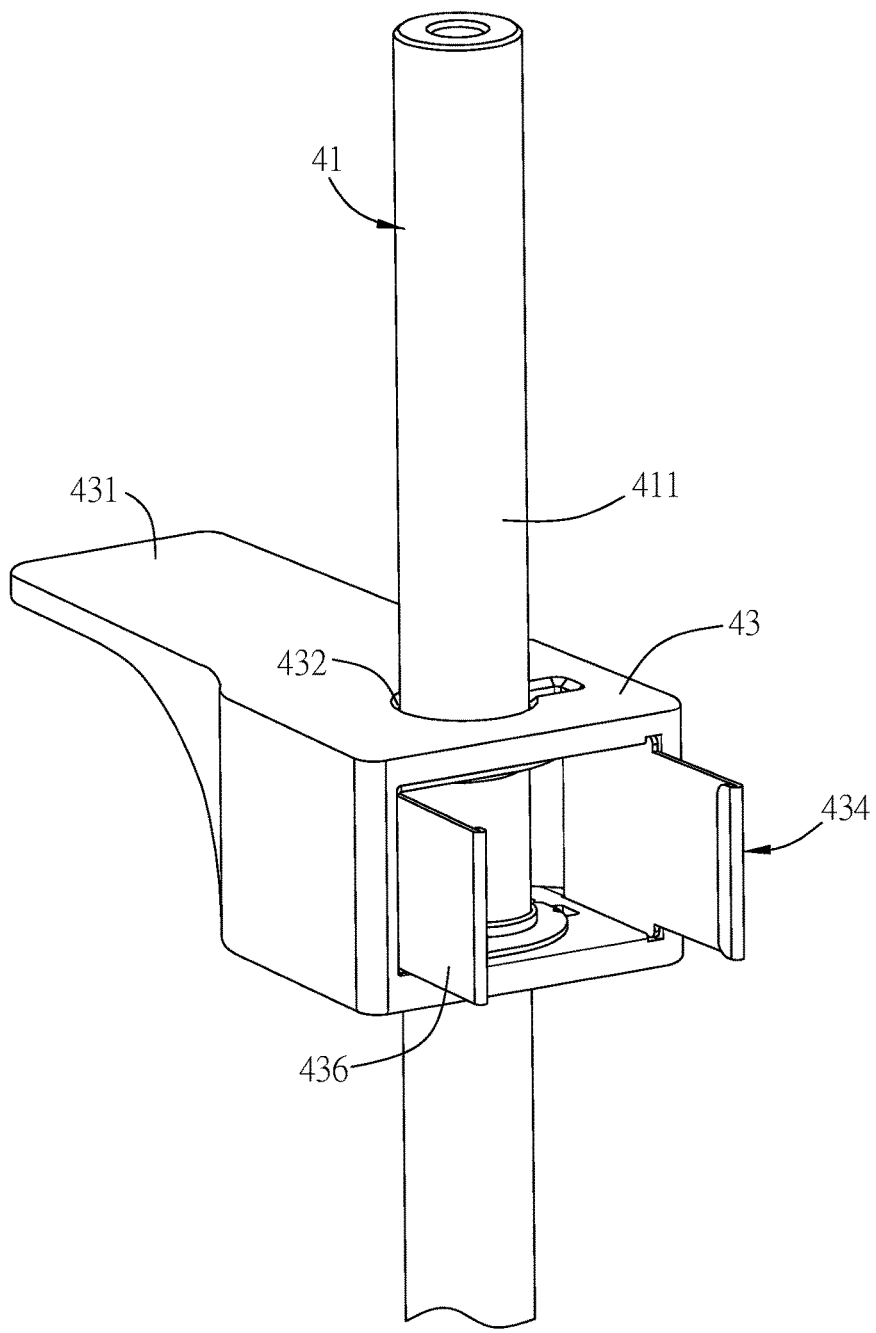
FIG. 5C and FIG. 5D show schematic views of the support element.
Figure 5D:
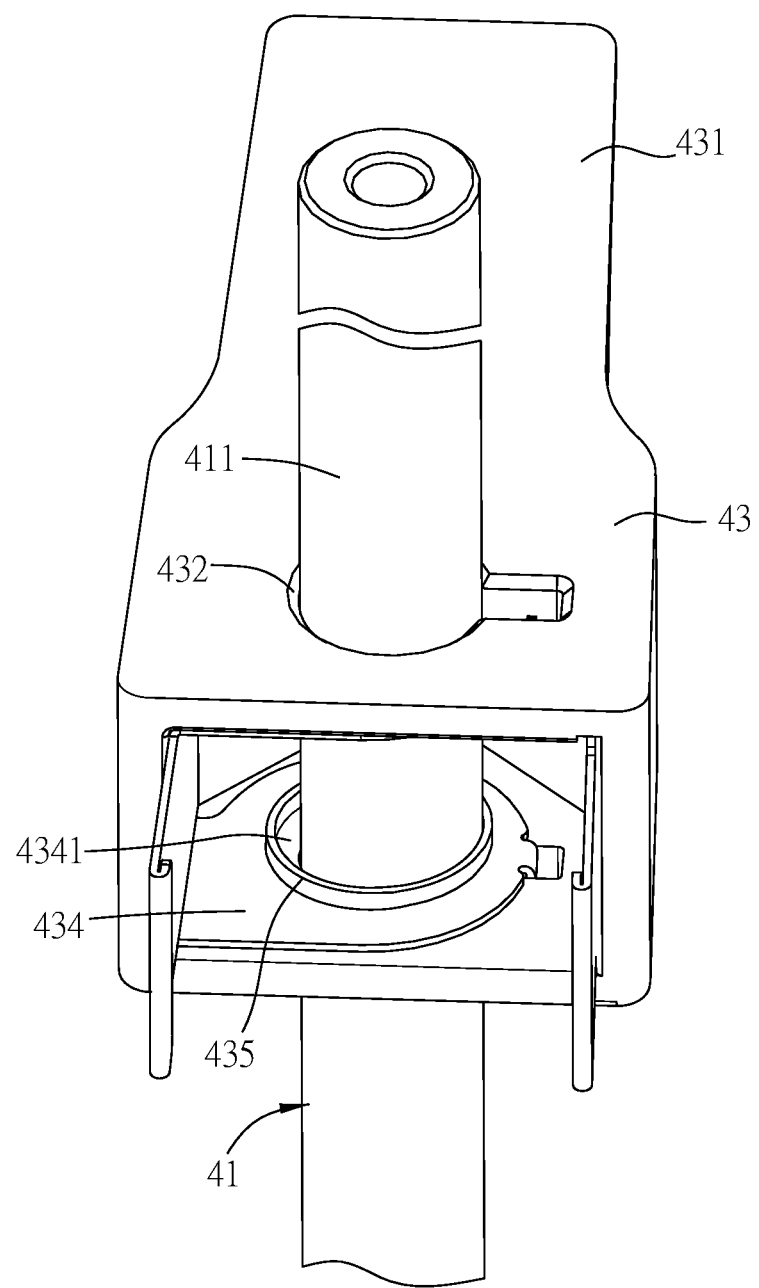

FIG. 5C and FIG. 5D show schematic views of the support element. As shown in FIG. 5C and FIG. 5D, the support element 43 includes a main body 431 and a self-locking spring slice 434. The main body includes a through hole 432, which is passed through by the slide-guiding portion 411. The self-locking spring slice 434 is disposed in the main body 431 and abutted the slide-guiding portion 411. While the self-locking spring slice 434 is pressed and pushed, the slide-guiding portion 411 is released from the self-locking spring slice 434. Therefore, the users can adjust the support element 43 by single hand.

For example, the self-locking spring slice 434 includes a through hole 4341 in the center, providing the slide-guiding portion 411 to be passed through. In the default state, the slide-guiding portion 411 is unable to move the support element 43, thus being fixed. The users can press the board piece 436 to drive the sidewall 435 moving, such that the slide-guiding portion 411 is not abutted by the sidewall 435 anymore. The support element 43 is capable of moving or rotating.

In the above-mentioned embodiments, the support element of FIG. 5A and FIG. 5C is capable of being applied on the slide-guiding portion of FIG. 2A to FIG. 2C. The support element of FIG. 2A to FIG. 2C is capable of being applied on the slide-guiding portion of FIG. 5A and FIG. 5C.

In the above-mentioned embodiments, the changes of base of FIG. 5A and FIG. 5C are capable of being applied on the base of FIG. 2A to FIG. 2C. The changes of the base of FIG. 2A to FIG. 2C are capable of being applied on the base of FIG. 5A and FIG. 5C.

Although the adjustable supports for multi-axis of the above-mentioned embodiment are used for supporting the display card, however, these embodiments are not used to limit the present invention. The users may can apply the adjustable supports for multi-axis in different applications, such as supporting the heat dissipating device, the radiator of the cooling system, or the SSD module.

Otherwise, the host device 1 might be other kinds of host, which is not limited to desktop computer.

As mentioned above, according to the adjustable support for multi-axis and host device, the adjustable support for multi-axis is capable of being easily installed in the host device. The position of the adjustable support for multi-axis is adjusted according to the length and the position of the interface card to be supported and the space in the case. Accordingly, the adjustable support for multi-axis is capable of supporting the element in the host device at proper position. Otherwise, users can fix the installation portion of the adjustable support for multi-axis on the frame of the computer case, or even detach from the frame. In addition, the frame includes a plurality of positioning elements. Users can choose positioning element on the appropriate position to install the adjustable support for multi-axis. Hence, users are able to adjust the position of the adjustable support for multi-axis according to the position of the elements in the computer case; thus, the adjustable support for multi-axis is able to be located on the appropriate position to support the element installed on the host device.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An adjustable support for multi-axis is adapted for a host device where at least one element is installed, comprises:
    a base comprising:
        an installation portion located at one end of the base; and
        a slide-guiding portion located at the center of the base;
        at least one installation element disposed on the installation portion for being detachably attached to the host device; and
        a support element adjustably disposed on the slide-guiding portion, wherein when the support element is fixed, one end of the support element is capable of supporting the at least one element, wherein when adjusting the position of the support element, the support element is capable of moving on the slide-guiding portion and rotating about the slide-guiding portion.

2. The adjustable support for multi-axis of claim 1, wherein a frame of the host device includes at least a positioning element, the installation element is a convex column configured to insert into and fix on at least one of the positioning element, the adjustable support for multi-axis is fixed on the host device, the adjustable support for multi-axis is capable of being dismantled by hand, and the support element supports the at least one element along a vertical direction.

3. The adjustable support for multi-axis of claim 1, wherein the installation element is adjustably disposed on the installation portion, the installation element is capable of moving on the installation portion for adjusting the position of the installation element on the installation portion.

4. The adjustable support for multi-axis of claim 1, wherein the installation element includes at least two stand bars, the stand bars are configured to rotate around the installation portion for being disposed on the installation portion, such that the angle between the stand bars is adjustable.

5. The adjustable support for multi-axis of claim 4, wherein the stand bars include magnetic pieces, the magnetic pieces attaches on the host device, such that the installation element is detachably disposed on the host device.

6. The adjustable support for multi-axis of claim 1, wherein the base further comprises at least one bending portion, one end of the bending portion connects one end of the slide-guiding portion, and another end of the bending portion connects the installation portion.

7. The adjustable support for multi-axis of claim 1, wherein the slide-guiding portion is a cylinder or a prism.

8. The adjustable support for multi-axis of claim 1, wherein the base comprises a plurality of shafts, and the shafts are sequentially combined to form slide-guiding portion.

9. The adjustable support for multi-axis of claim 8, wherein one end of each shaft includes a male pitch thread, and another end of each shaft includes a female pitch thread.

10. The adjustable support for multi-axis of claim 1, the support element further includes:
   a slide-rotating portion adjustably disposed on the slide-guiding portion, wherein when adjusting the position of the support element, the slide-rotating portion is capable of moving along a first direction on the slide-guiding portion and rotating about the slide-guiding portion; and
   a support portion connecting the slide-rotating portion, wherein when the slide-rotating portion is fixed, the support element is capable of supporting the at least one element.

11. The adjustable support for multi-axis of claim 10, wherein the support element is board-shaped or frame-shaped.

12. The adjustable support for multi-axis of claim 10, wherein the slide-rotating portion is adjustably fixed on the slide-guiding portion by a screw.

13. The adjustable support for multi-axis of claim 1, wherein the support element comprises:
   a main body including a through hole for being passed through by the slide-guiding portion; and
   a cam pivoted on the main body and adjustably abutted on the slide-guiding portion.

14. The adjustable support for multi-axis of claim 1, wherein the support element comprises:
   a main body including a through hole for being passed through by the slide-guiding portion; and
   a self-locking spring slice disposed in the main body and abutted the slide-guiding portion, wherein when the self-locking spring slice is pressed and pushed, the slide-guiding portion is released from the self-locking spring slice.

15. The adjustable support for multi-axis of claim 1, wherein the frame of the host device includes at least one positioning element, the installation element is a convex column configured to insert into and fix on at least one of the positioning element, the adjustable support for multi-axis is fixed on the host device, the adjustable support for multi-axis is capable of being dismantled by hand, and the support element supports the at least one element along a vertical direction,
wherein the installation element is adjustably disposed on the installation portion, the installation element is capable of moving on the installation portion for adjusting the position of the installation element on the installation portion,
wherein the base further comprises at least one bending portion, one end of the bending portion connects one end of the slide-guiding portion, another end of the bending portion connects the installation portion,
wherein the slide-guiding portion is a cylinder or a prism.

16. The adjustable support for multi-axis of claim 1,
wherein the installation element includes at least two stand bars, the stand bars are configured to rotate around the installation portion for being disposed on the installation portion, such that the angle between the stand bars is adjustable,
wherein the stand bars include magnetic pieces, the magnetic pieces attached on the host device, such that the installation element is detachably disposed on the host device,
wherein the base comprises a plurality of shafts, the shafts are sequentially combined to form slide-guiding portion,
wherein one end of each shaft includes a male pitch thread, and another end of each shaft includes a female pitch thread,
wherein the support element comprises:
   a main body including a through hole for being passed through by the slide-guiding portion; and
   a cam pivoted on the main body and adjustably abutted on the slide-guiding portion.

17. The adjustable support for multi-axis of claim 1,
wherein the installation element includes at least two stand bars, the stand bars are configured to rotate around the installation portion for being disposed on the installation portion, such that the angle between the stand bars is adjustable,
wherein the stand bars include magnetic pieces, the magnetic pieces attached on the host device, such that the installation element is detachably disposed on the host device,
wherein the base comprises a plurality of shafts, the shafts are sequentially combined to form slide-guiding portion,
wherein one end of each shaft includes a male pitch thread, and another end of each shaft includes a female pitch thread,
wherein the support element comprises:
   a main body including a through hole for being passed through by the slide-guiding portion; and
   a self-locking spring slice disposed in the main body and abutted the slide-guiding portion, wherein when the self-locking spring slice is pressed and pushed, the slide-guiding portion released from the self-locking spring slice.

18. A host device comprises:
a case; and
an adjustable support for multi-axis, comprised:
   a base comprising:
      an installation portion located at one end of the base; and
      a slide-guiding portion located at the center of the base;
   at least one installation element disposed on the installation portion for being detachably attached to the host device; and
   a support element adjustably disposed on the slide-guiding portion, wherein when the support element is fixed, one end of the support element is capable of supporting the at least one element, wherein when adjusting the position of the support element, the support element is capable of moving on the slide-guiding portion and rotating about the slide-guiding portion.

* * * * *